United States Patent
Suzuki

(10) Patent No.: US 7,218,900 B2
(45) Date of Patent: May 15, 2007

(54) RADIO TRANSMITTER AND RECEIVER

(75) Inventor: Masami Suzuki, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 1180 days.

(21) Appl. No.: 10/013,848

(22) Filed: Dec. 13, 2001

(65) Prior Publication Data

US 2002/0077072 A1    Jun. 20, 2002

(30) Foreign Application Priority Data

Dec. 14, 2000    (JP)    ............................. 2000-380672

(51) Int. Cl.
*H04B 1/18*    (2006.01)
*H04Q 7/20*    (2006.01)

(52) U.S. Cl. .................. 455/180.1; 455/450; 455/41.2; 455/184.1

(58) Field of Classification Search ............... 455/41.2, 455/180.1, 184.1, 450

See application file for complete search history.

(56) References Cited

U.S. PATENT DOCUMENTS

| 6,839,325 B2* | 1/2005 | Schmidl et al. ............. 370/242 |
| 2003/0054827 A1* | 3/2003 | Schmidl et al. ............. 455/450 |
| 2004/0120341 A1* | 6/2004 | Hur et al. .................... 370/442 |

* cited by examiner

*Primary Examiner*—Barry Taylor
(74) *Attorney, Agent, or Firm*—McGinn IP Law Group, PLLC

(57) ABSTRACT

A broadband signal radio communication device which is capable of transmitting audio signals in a frequency band wider than a normal transmission band from 0 to 4 kHz in a radio system such as Bluetooth which employs a radio communication link through weak radiowaves. A plurality of channels are set between the same master and slave out of three channels maximally available on a synchronous connection oriented (SCO) communication link. The band of a transmitted audio signal is divided into a plurality of sub-bands each having a bandwidth of 4 kHz using a sub-band analysis approach, and the signals in the respective bands are assigned to associated SCO links for transmission. On the reception side, the signals in the respective bands, received through the plurality of SCO links, are synthesized by a sub-band synthesis approach to reproduce an audio signal having the original frequency band.

16 Claims, 5 Drawing Sheets

RADIO TRANSMITTER AND RECEIVER

BACKGROUND OF THE INVENTION

1. Field of the Invention

The present invention relates to a radio communication device which use at least one communication link for one-channel signal transmission.

2. Description of the Related Art

Bluetooth radio system (hereinafter simply called "Bluetooth") is known as a radio communication device which uses at least one radio communication link for one-channel signal transmission.

This system is a radio communication system which interconnects devices placed quite close to each other, for example, a portable telephone and a notebook type personal computer, a stereo system and a headphone, and the like through a radio communication link using very weak radiowaves in a 2.4 GHz band, which does not require a license, to transmit data and audio.

For transmitting an audio signal in Bluetooth, the audio signal is converted to a digital signal by an audio codec (coder/decoder), generally employed in PCM communications for transmission. For quantization and encoding involved in the digital conversion, radio communication systems generally employ a logarithmic quantization scheme which implements 8-bit logarithmic quantization of an audio signal at a sampling frequency of 8 kHz, or a CVSD (Continuous Variable Slope Delta modulation) scheme which implements 1-bit quantization of an audio signal at a sampling frequency of 64 kHz. Therefore, the data transmission rate is 64 kb/s whether an audio signal is transmitted in accordance with any of the two scheme.

In the Bluetooth-based data transmission, devices which make communication to each other form a network called a "piconet" for mutual communications. The piconet includes a device called a master which takes the leadership within the piconet. The remaining devices within the piconet other than the master are called slaves which transmit data with the master under the leadership of the master.

The data transmission between the master and a slave is based on a time slot (625 μS) on the time axis which is mutually used by them in time division. Specifically, the data transmission between the master and slave employs a TDD (Time Division Duplexing) scheme which alternates transmission and reception for a half-duplex communication.

There are two types of communication links which are set between a master and slaves for data transmission: an SCO (Synchronous Connection Oriented) link (communication link for synchronous connection) and an ACL (Asynchronous Connection Less) link (communication link for asynchronous connection). The SOC link refers to a link formation which fixedly uses predetermined time slots for data transmission. The ACL link in turn refers to a link formation which utilizes an unused slot, each time data is transmitted, to specify the address of a slave which should receive the data. Generally, the SCO link is often utilized for audio data transmission because the real time capability is required.

There are three types of packet modes HV1, HV2, HV3, as data packets for use in the SCO link, according to the proportion of transmission data to an error correcting code added to the data. Out of these modes, an HV3-mode packet consists only of 240 bits of data without any error correcting code and therefore provides the highest transmission efficiency. For this reason, the HV3 mode is often used for the SCO links intended for audio transmission.

The two audio encoding schemes in Bluetooth, i.e., logarithmic quantization and CVSD-based quantization both assume that only audio signals are transmitted in a frequency band from 0 to 4 kHz. Specifically, when the logarithmic quantization is used, an audio signal is subjected to 8-bit logarithmic quantization after it is A/D converted at sampling frequency of 8 kHz, so that the signal frequency band is necessarily limited to 4 kHz. On the other hand, when the CVSD scheme is used, an audio signal is sampled at sampling frequency of 64 kHz, however, the band must be limited to 4 kHz before an audio signal is input to a CVSD encoder circuit. Since the CVSD scheme relies on a waveform gradient adaptive delta modulation, the limitation of the band is required for removing unnecessary high frequency components for suppressing the occurrence of so-called gradient distortion.

However, it is believed that an upper limit of human's audible frequencies is generally near 20 kHz, so that an audio band from 0 to 4 kHz cannot provide a sufficient audio quality at all times. Actually, the audio transmission using the SCO link of Bluetooth lacks clearness and natural impression and often loses inherent tonal characteristcs of speakers. Therefore, the transmission of audio signal over a wider frequency band is highly demanded in some communication applications.

OBJECT AND SUMMARY OF THE INVENTION

The present invention has been made to solve the disadvantages as mentioned above, and provides a broadband signal transmitter based on a Bluetooth radio system which is capable of transmitting audio signals over a band wider than 4 kHz.

The present invention provides a transmitter for transmitting an analog signal having a predetermined frequency band by assigning the analog signal to at least one communication link for transmission.

The transmitter comprises:

an initial setting circuit for exchanging initial setting information with a communication party to set proper communication format and protocol;

a selector for selecting a communication link for use in transmission based on the initial setting information of the communication party acquired by the initial setting circuit; and a transmitting circuit for transmitting the analog signal having the predetermined frequency band using the communication link selected by the selector.

The present invention also provide a receiver for receiving a signal from a transmitter for transmitting an analog signal having a predetermined frequency band by assigning the analog signal to at least one communication link for transmission.

The receiver comprises:

an initial setting circuit for exchanging initial setting information with a communication party to set proper communication format and protocol;

a selector for selecting a communication link for use in reception based on the initial setting information of the communication party acquired by the initial setting circuit; and a receiver/demodulator for receiving and demodulating the analog signal having the predetermined frequency band using the communication link selected by the selector.

DETAILED DESCRIPTION OF EMBODIMENTS

Figure 1:
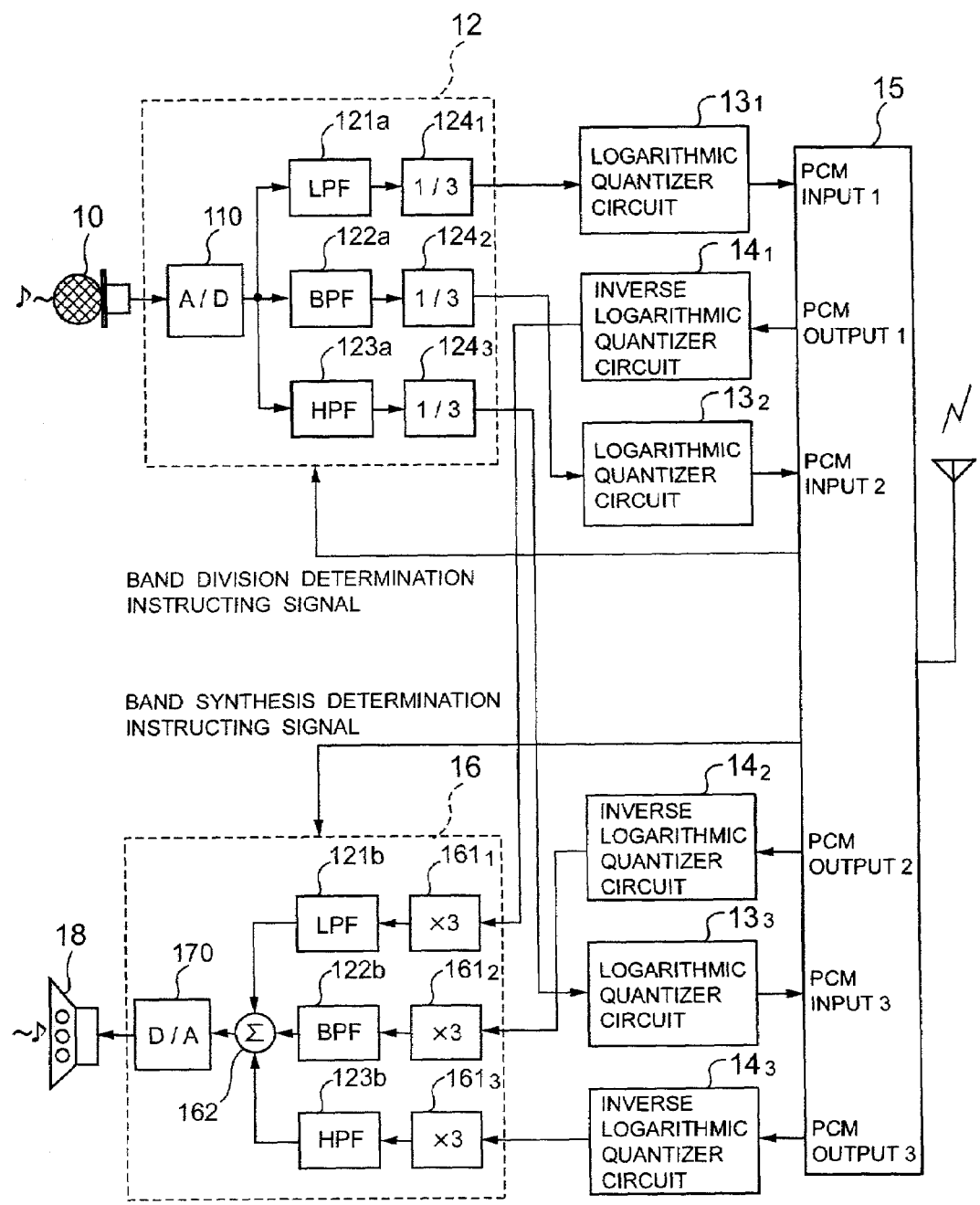
FIG. 1 is a block diagram illustrating the configuration of a broadband signal transmitter which utilizes a Bluetooth radio system in accordance with one embodiment of the present invention.

FIG. 1 is a block diagram illustrating the configuration of a first embodiment of a broadband signal transmitter which uses a Bluetooth radio system in accordance with the present invention.

In FIG. 1, a microphone 10 is an audio/electric signal transducer for capturing a speech to be transmitted and transducing the speech into an electric signal. An analog/digital converter circuit (hereinafter simply called the "A/D converter circuit") 110 is a circuit for converting a captured analog signal to a digital signal, and in the embodiment illustrated in FIG. 1, may use, for example, 24 kHz as a sampling frequency for sampling. As is apparent from the sampling theorem which defines that a signal in a band f (Hz) can be sampled at sampling frequency sf (Hz), input audio signals can be captured over a frequency band from 0 to 12 kHz in this configuration.

A sub-band analyzer circuit 12 is a circuit for making a so-called sub-band analysis on data supplied from the A/D converter circuit 110. The sub-band analysis refers to a technique widely utilized for encoding audio signal, particularly encoding broadband audio signals in digital signal processing. For example, for two-band division, the specifications of the sub-band analysis are defined in ITU-T audio encoding standard G.722 and the like. The sub-band analyzer circuit 12 comprises three sub-band analyzing filters including a low range signal extraction filter 121a, a middle range signal extraction filter 122a and a high range signal extraction filter 123a, sampling frequency divider circuits $124_1$–$124_3$, and the like. Alternatively, as illustrated in the embodiment of FIG. 1, the A/D converter 110 may be included in the sub-band analyzer circuit 12.

An encoder circuit 13 is a circuit for performing 8-bit quantization and encoding for sampling signals from the respective filters of the sub-band analyzer circuit 12. As to the quantization and the like, the encoder circuit 13 employs an 8-bit logarithmic quantization scheme which compresses a sampled signal in conformity to an A-law or a i-low which is generally used for PCM communication lines. A decoder circuit 14 is a circuit for decoding a PCM signal received from another Bluetooth device existing in the same piconet by decompressing the PCM signal in accordance with the reverse characteristic of the encoder circuit 13.

A control circuit 15 governs the overall control for a Bluetooth radio link, and is mainly comprised of a microcomputer, and memory devices including ROM (Read Only Memory), RAM (Random Access Memory) and the like. The control circuit 15 also includes a high frequency transceiver circuit for actually transmitting/receiving radiowaves through the radio link, a modulator/demodulator circuit for converting transmitted/received data to a form suitable for the radio link, and the like.

A sub-band synthesizer circuit 16 is a circuit for performing the digital signal processing in the order reverse to that of the sub-band analyzer circuit 12. Specifically, the sub-band synthesizer circuit 16 interpolates the sampling frequency of signals which are received separately in a plurality of frequency bands for increasing the sampling frequency, and adds the resulting signals by the same filters as those used in the sub-band analyzer circuit 12 to synthesize or recover an audio signal which has the original frequency band. Thus, the sub-band synthesizer circuit 16 is comprised of a sampling frequency multiplier circuits $161_1$–$161_3$, a low range signal extraction filter 121b, a middle range signal extraction filter 122b, a high range signal extraction filter 123b, an adder circuit 162, and the like.

A digital/analog converter circuit (hereinafter simply called the "D/A converter circuit") 170 is a circuit for converting a digital signal output from the sub-band synthesizer circuit 16 to an analog signal. As illustrated in the embodiment of FIG. 1, the D/A converter circuit 170 may be included in the sub-band synthesizer circuit 16.

A speaker 18 is a component for transducing an analog signal output from the D/A converter circuit 170 into a sound signal.

In the following, the operation will be described for the embodiment illustrated in FIG. 1.

First, an audio signal input from the microphone 10 is applied to the sub-band analyzer circuit 12. Within the sub-band analyzer circuit 12, the input audio signal is sampled by the A/D converter circuit 110, for example, at sampling frequency of 24 kHz. In this event, therefore, the frequency band for the output signal from the A/D converter circuit 110 ranges from 0 to 12 kHz according to the sampling theorem.

Next, the sub-band analyzer circuit 12 passes the output signal through a plurality of digital filters arranged in array to divide the output signal into a plurality of frequency bands. According to a sub-band analysis approach in the digital signal processing, a band of a signal generated by the division may have a width calculated by dividing the frequency band of the original signal by an integer. For example, the frequency band of the original signal may be divided by two using QMF (Quadrature Mirror Filter), or divided by three or more using PQF (Polyphase Quadrature Filter).

In the embodiment illustrated in FIG. 1, the output signal from the A/D converter circuit 110 is equally divided, for example, into three by the filters 121a–123a each having a band of 4 kHz. Specifically, the original signal having the frequency band from 0 to 12 kHz is divided into three signal frequency bands, i.e., a low range signal from 0 to 4 kHz by the low range signal extraction filter 121a; a middle range signal from 4 kHz to 8 kHz by the middle range signal extraction filter 122a; and a high range signal from 8 kHz to 12 kHz by the high range signal extraction filter 123a.

The number of frequency bands into which the frequency band of the original signal is divided in the sub-band analyzer circuit 12 is determined by initial setting conditions which have been exchanged with a master or a slave that is the destination with which an audio communication is to be made. Specifically, when the control circuits 15 of both parties in communication have a function of supporting three channels of SCO links, the frequency band of the original signal is divided by three. Otherwise, the frequency band is divided by two when the control circuits 15 only support two channels, or when one channel has been in use for a communication with another device even if the control circuits 15 can support three channels.

When only one channel of SCO link is supported, or when only one channel can be used for reasons of communications with other Bluetooth devices, audio communications are made through an SCO link which uses a normal band from 0 to 4 kHz in the Bluetooth radio system.

Assume that the selection for the number by which the band is divided in the sub-band analyzer circuit 12 is instructed by a band division determination instructing signal supplied from the control circuit 15.

The signals divided into the respective bands by the respective filters associated therewith are decimated by the sampling frequency divider circuits $124_1$–$124_3$ for each band to 8 kHz which is one third of the sampling frequency 24 kHz of the original signal. In this way, the output signals from the respective filters 121a–123a are all shifted in frequency to a band from 0 to 4 kHz.

The signals in the respective bands, which have passed through the sampling frequency divider circuits $124_1$–$124_3$, are subjected to 8-bit quantization and encoding by logarithmic quantizer circuits $13_1$–$13_3$, which function as encoder circuits for the respective bands, and supplied to PCM input ports of the control circuit 15. In the embodiment illustrated in FIG. 1, the control circuit 15 has three sets of PCM input/output ports, each of which is supplied with the low range signal, middle range signal or high range signal. Subsequently, the control circuit 15 sets SCO links among other particular Bluetooth devices existing within the same piconet for transmitting audio signal data using the aforementioned packets of HV3-mode.

The 8-bit logarithmic quantization for an audio signal at sampling frequency of 8 kHz will result in one sample (8 bits) of audio data generated every sampling period 125 µS (⅛ kHz). Therefore, when using the packet of HV3 mode which has the data transmission capacity of 240 bits, 30 samples (240 bits/8 bits) of audio data can be transmitted in one packet. This means that audio data corresponding to 30 times as wide as the sampling period 125 µS, i.e., 3750 iS can be transmitted in one packet of HV3 mode.

This time length corresponds to six slots (3750 µS/625 µS=6 slots) when expressed in time slots of Bluetooth. Specifically, for transmitting audio data, which has undergone 8-bit quantization at 8 kHz (64 kb/s), on a Bluetooth radio link, an audio signal can be transmitted in real time when one packet of HV3 mode is transmitted every six slots of the SCO link.

On the other hand, the Bluetooth radio link employs the TDD-based half-duplex communication scheme between a master and slaves as mentioned above. Therefore, for implementing a full-duplex communication of audio signals between a master and a slave, the master or slave which has transmitted an audio data packet in one time slot must receive an audio data packet from the counterpart in the next time slot.

Figure 2A:
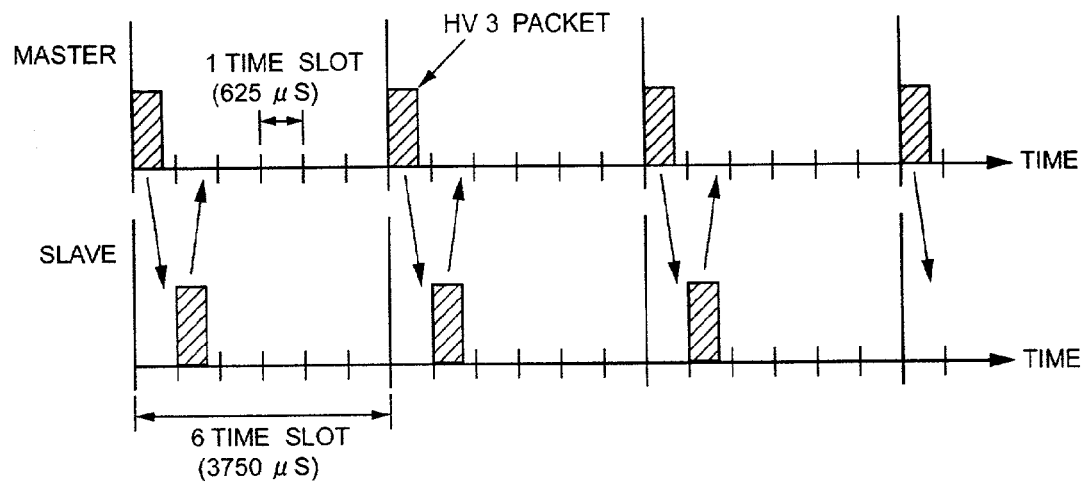
FIGS. 2A and 2B are time charts showing how data is transmitted on a radio link in the embodiment of FIG. 1.
Figure 2B:
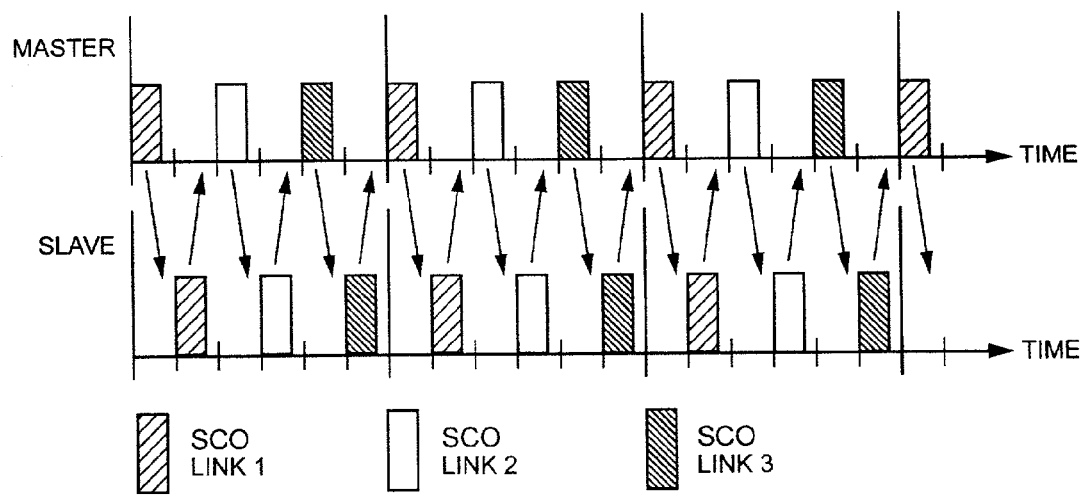

Specifically, as shown in FIG. 2A, for bidirectionally transmitting audio data quantized at 64 kb/s using packets of HV3 mode in real time, two time slots are required on the Bluetooth radio link. As such, when SCO links are set in all of six time slots of the Bluetooth radio link, three sets of audio data quantized at 64 kb/s can be bidirectionally transmitted in real time as shown in FIG. 2B.

In the embodiment illustrated in FIG. 1, one SCO link is provided for each of the ports PCM1–PCM3 of the control circuit 15, which is supplied with a low range signal, a middle range signal and a high range signal, respectively, which are divided from an audio signal having a band from 0 to 12 kHz. As appreciated, the configuration illustrated in this embodiment, when used, enables real-time transmission of an audio signal which has a band three times wider than the band from 0 to 4 kHz available on a normal SOC link, between a master and a slave, by dividing the audio signal into three which are assigned to three channels of SCO links.

On the other hand, similar processing is performed in the counterpart which is in a position of a master or a slave for the communication device to transmit encoded data of the audio signal on the counterpart side to the transmission side. The control circuit 15 supplies the received data to the decoder circuit 14 provided for each PCM port to decode the received PCM signal and decompress the same by the decompress circuit having the reverse logarithmic quantization characteristic.

The outputs from the decoder circuits 14 are supplied to the sub-band synthesizer circuit 16 which synthesizes the frequency band of the original signal through a procedure reverse to that of the transmission.

Specifically, the signals in the low, middle and high bands output from the respective decoder circuits 14 are first interpolated by sampling frequency multiplier circuits $161_1$–$161_3$ for each band to multiply the sampling frequency by three. This results in an increase of the sampling frequency of the signal in each band from 8 kHz to 24 kHz. After this processing, the outputs of the sampling frequency multiplier circuits $161_1$–$161_3$ are passed through digital filters 121b–123b identical to those used in the sub-band analyzer circuit 12, respectively, thereby causing the respective filters to output a low range signal from 0 to 4 kHz, a middle range signal from 4 kHz to 8 kHz, and a high range signal from 8 kHz to 12 kHz. The signals in the respective bands are synthesized by an adder circuit 162 to recover a full band (from 0 to 12 kHz) of the original audio signal.

The foregoing description has shown an exemplary band synthesis when three signals divided from an original signal band are received through three-channels of SCO links. When a communication is made through two channels of SCO links, two divided signals, i.e., a low range signal from 0 to 4 kHz and a high range signal from 4 kHz to 8 kHz are used to synthesize the original signal band. Also, when a communication is made through only one channel of SCO link, a frequency band from 0 to 4 kHz is restored, i.e., the normal audio signal band in the Bluetooth radio system.

Assume that the number of SCO links from which received signals are used to synthesize the original band in the sub-band synthesizer circuit 16 is selected y a band division determination instructing signal supplied from the control circuit 15 to the sub-band synthesizer circuit 16.

The audio signal synthesized by the adder circuit 162 is converted by the D/A converter circuit 170 to an analog signal which is output as a sound output from the speaker 18.

Next, the processing involved in setting the Bluetooth radio link will be described in the embodiment of FIG. 1.

Figure 3:
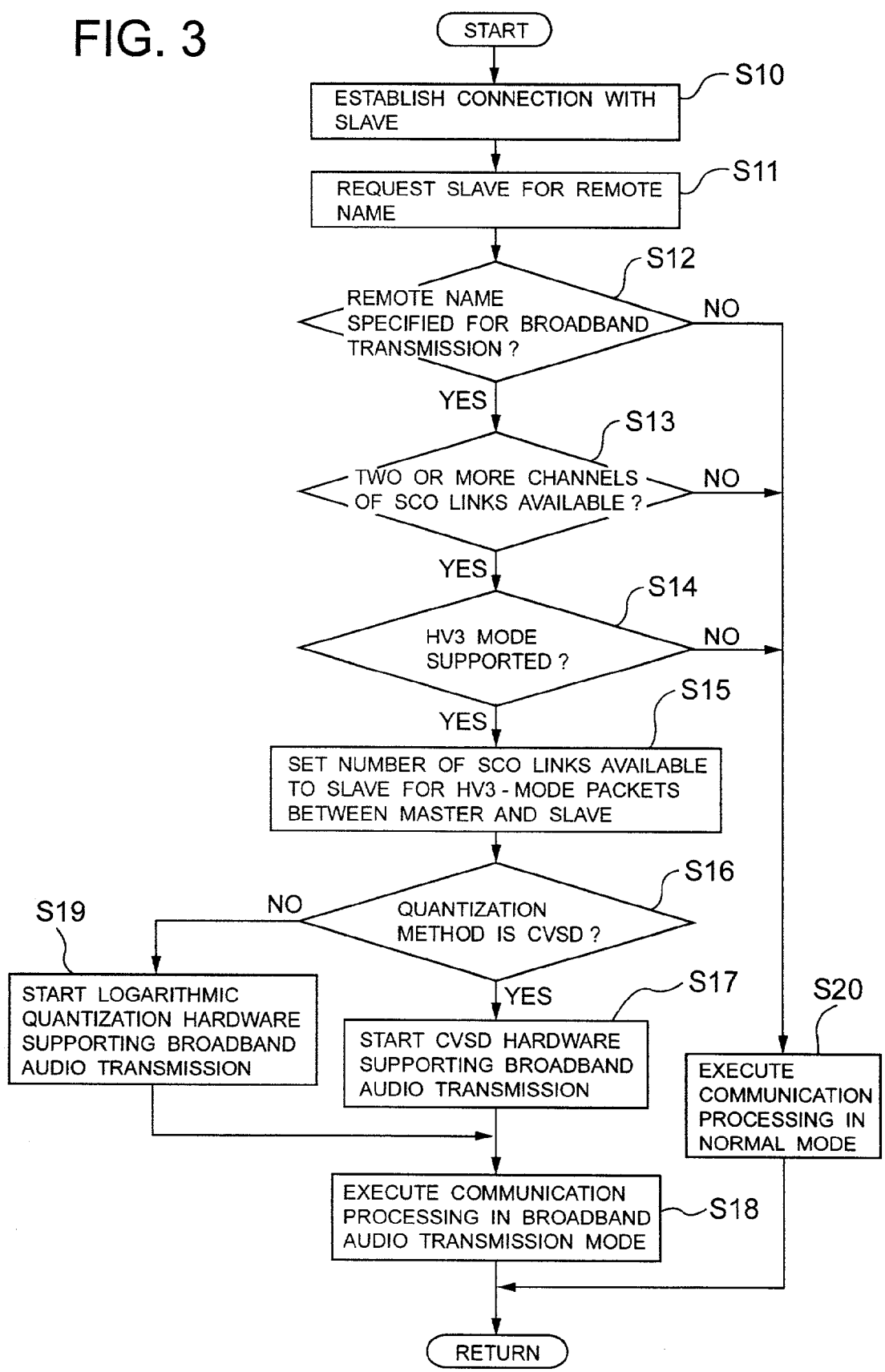
FIG. 3 is a flowchart illustrating a processing procedure on the master side for setting a radio link between a master and a slave in the embodiment of FIG. 1.

First, FIG. 3 shows in flowchart a processing subroutine until a radio link is set in the master side of Bluetooth, taken as an example. The subroutine program is stored, for example, in a ROM of a memory unit in the control circuit 15, and invoked in response to a predetermined timing. Then, the program is executed step by step in synchronism with a built-in clock of ICPU within the control circuit 15.

Alternatively, the subroutine program may be downloaded from a control circuit (not shown) of another device, for example, a personal computer, in which the Bluetooth terminal illustrated in FIG. 1 is installed, to a memory area in the control circuit 15, instead of residing in the memory of the control circuit 15.

In the flowchart of FIG. 3, the master first establishes a connection on the piconet with a particular slave through a Bluetooth radio link.

Generally, for establishing a connection for a communication device, a predetermined communication protocol is required. Bluetooth supports a multi-layer structured communication protocol called "protocol stack." At step 10 in FIG. 3, the master utilizes a link manager protocol provided by the protocol stack to set a connection with a particular slave. For reference, the rink manager protocol has a function of governing a communication control and security on the link.

After a physical connection has been established between the master and slave, the master transmits a "remote name request command" to the slave (step 11). The remote name refers to a unique name given to a Bluetooth device which belongs to a piconet. The remote name can be set in correspondence to a special function possessed by the device. Therefore, when a special name is set for the remote name for indicating that the broadband audio transmission of the present invention is supported, it is possible to readily determine whether or not the broadband audio transmission is available between devices which have established a connection on the piconet.

At step 12, the master identifies a remote name returned from the slave to determine whether or not the slave, which the connection was established, has a broadband audio transmission function. When the slave has this function, the master detects the number of channels available for the current broadband audio transmission to again determine whether or not the slave can provide two channel or more for the current broadband audio transmission (step 13). This determination is made because the slave may have already used the SCO link for a communication with another Bluetooth device in some cases though the master has found at step 12 that the slave has the broadband audio transmission function.

When the master finds at step 13 that the slave can provide two or more channels for the current broadband audio transmission, the master determines whether or not the slave supports the packets of HV3 mode (step 14). Then, when the foregoing conditions become clear, the master sets the number of channels found at step 13 for the SCO links on which the packets of HV3 mode are used between the master and slave (step 15).

Next, the master queries a quantization method in the slave to determine whether the slave employs the logarithmic quantization or CVSD-based quantization (step 16). Then, the master itself starts quantization hardware which supports the quantization method of the slave (steps 17, 19). However, these processing steps can be selectively executed only by a master which has both functions of the logarithmic quantization and CVSD-based quantization, later described. Therefore, when the master has only one of these functions, the broadband audio communication can be implemented only when the function is compatible with that of the slave.

The foregoing processing enables the broadband transmission for audio signals between the master and slave, so that the master starts broadband transmission processing with the slave at step 18.

On the other hand, at the foregoing step 12, if the remote name returned from the slave does not correspond to the broadband audio transmission, i.e., the slave is not configured to have the broadband audio transmission function as illustrated in the embodiment, the subroutine proceeds to step 20 where the master executes the communication processing in a normal communication mode. Specifically, audio signals are transmitted between the master and slave in band from 0 to 4 kHz using a normal SCO link. The same is also applied when it is found at step 13 that the slave cannot provide two or more channels of SCO links for the current broadband audio transmission.

When the slave does not support the SCO link, the audio communication is essentially unavailable, so that data communications can only be provided using an ACL link.

Also, when the slave does not support the packets of HV3 mode at step 14, the audio transmission is performed in the normal signal band at step 20.

Figure 4:
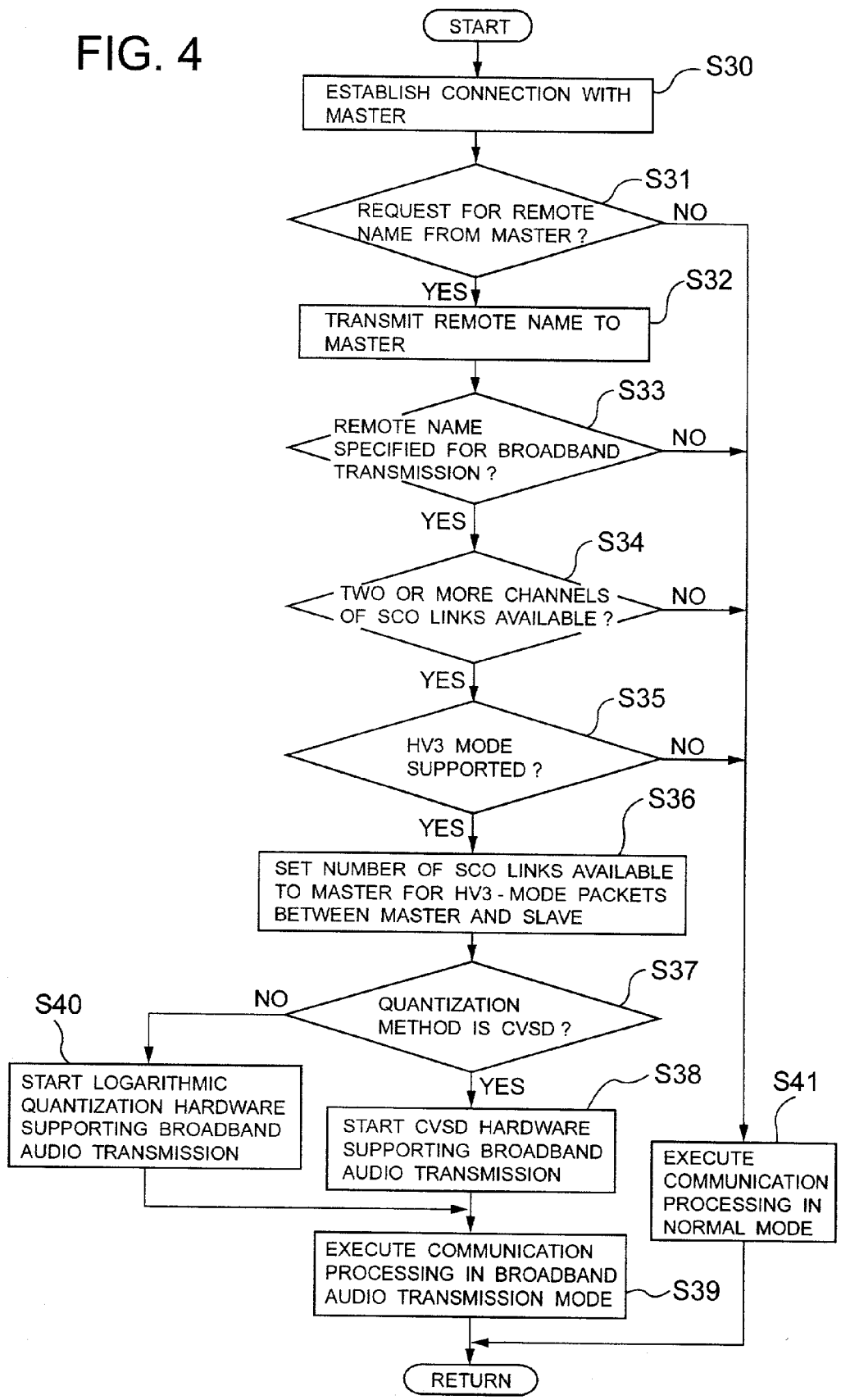
FIG. 4 is a flowchart illustrating a processing procedure on the slave side for setting a radio link between the master and slave in the embodiment of FIG. 1.

Next, a processing subroutine executed by a slave until a Bluetooth radio link is set is illustrated in a flowchart of FIG. 4.

Since this subroutine program is substantially similar to the subroutine program executed by the master illustrated in FIG. 3, the following description will be centered only on differences with the subroutine program of the master.

Specifically, after establishing a connection with the master on the piconet at step 30, the slave determines at step 31 whether or not the master has requested for the remote name. When the request has been made, the slave returns the remote name at step 32. Then, the processing at step 33 onward is similar to that at step 12 onward in the flowchart of FIG. 3. On the other hand, when no request for the remote name is made from the master, a normal communication processing operation is performed between the slave and master in the Bluetooth radio system (step 41).

Figure 5:
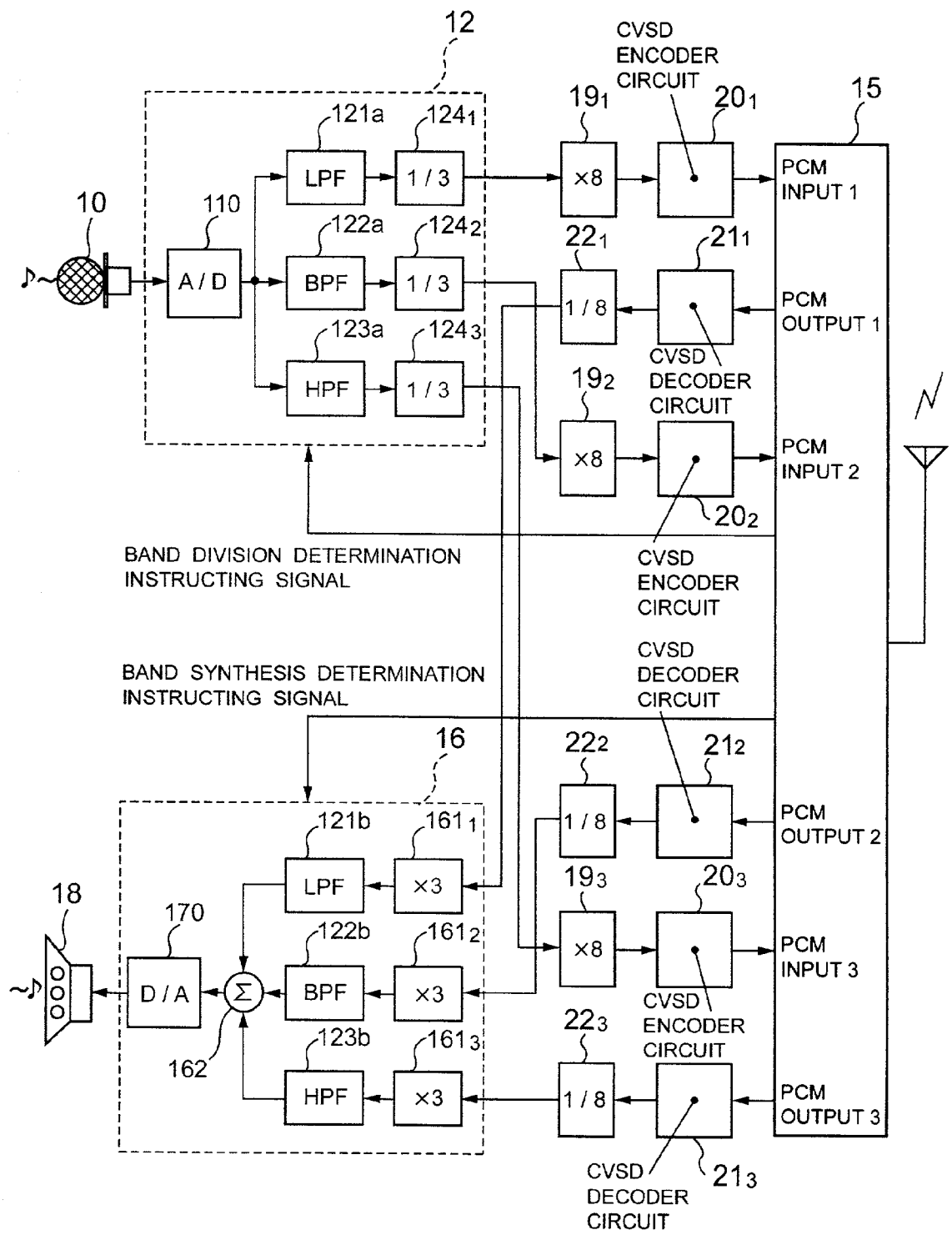
FIG. 5 is a block diagram illustrating the configuration of a broadband signal transmitter which utilizes a Bluetooth radio system in accordance with a second embodiment of the present invention.

Next, a second embodiment of the present invention is illustrated in a block diagram of FIG. 5.

The configuration illustrated in FIG. 5 differs from the configuration illustrated in FIG. 1 in that the CVSD-based quantization is employed for quantizing a sampled audio signal instead of the 8-bit logarithmic quantization. When the CVSD scheme is employed, CVSD encoder circuit and decoder circuit both operate at sampling frequency of 64 kHz. For this reason, 8-time interpolation must be performed after the sub-band analysis processing on the transmission side. On the reception side, on the other hand, the sampling frequency must be decimated by eight before synthesizing the sub-bands.

Specifically, outputs from respective bands of the sub-band analyzer circuit 12 (at sampling frequency of 8 kHz) are supplied to sampling frequency multiplier circuits $19_1$–$19_3$ to interpolate the sampling frequency to 64 kHz which is eight times higher than the sampling frequency. The resulting signals are applied to CVSD encoder circuits $20_1$–$20_3$ which perform delta modulation, i.e., 1-bit quantization, on the signals, and supply the modulated signals to the PCM input ports of the control circuit 15.

On the other hand, PCM signals received from another station are decoded by CVSD decoder circuits $21_1$–$21_3$, and the sampling frequency of the decoded signals are decimated to 8 kHz, which is one eighth, by sampling frequency divider circuits $22_1$–$22_3$. The resulting signals are applied to the sub-band synthesizer circuit 16.

The rest of the configuration in the embodiment illustrated in FIG. 5 is similar to that of the embodiment illustrated in FIG. 1 which employs the logarithmic quantization scheme.

The embodiment of FIG. 1 illustrates the configuration which relies on the 8-bit logarithmic quantization, while the embodiment of FIG. 5 illustrates the configuration which relies on the CVSD-based quantization. These can be both implemented by digital signal processing. Therefore, both embodiments are not necessarily alternative, but the schemes according to both embodiments can be simultaneously implemented in a one-chip digital signal processor (DSP) when using a large scale DSP which has an extremely high degree of integration. The employment of such a configuration enables the realization of broadband audio transmission without limitations to the quantization scheme employed by the counterpart for which a connection is established in the piconet.

Also, while in the description on the foregoing embodiments, the frequency band of the original signal is divided by three in the sub-band analysis and sub-band synthesis, the present invention is not limited to this particular number of division. For example, when both a master and a slave, which constitute a piconet, provide two available channels of SCO links, QMFs (Quadrature Mirror Filter) may be used as digital filters for use in the sub-band analysis and synthesis, in which case the frequency band of an original signal is divided by two.

In this case, on the transmission side, an input audio signal is sampled at sampling frequency of 16 kHz and captured as a signal in a band from 0 to 8 kHz, and then the signal is divided into a low range from 0 to 4 kHz and a high range from 4 kHz to 8 kHz.

When these audio data are transmitted using HV3-mode packets of the SCO link, only four time slots are required. Therefore, the remaining two within six slots can be used, for example, as an ACL link such that a general-purpose data communication can be made together with the broadband audio transmission.

Also, while the block diagrams in FIGS. 1 and 5 only illustrate the configurations, each of which comprises both transmission function and reception function, the present invention is not limited to such an implementation. Alternatively, the transmission function alone and the reception function alone may be installed separately in paired products which utilize the Bluetooth radio system such as a personal computer and a mobile terminal or a stereo and a headphone.

According to the present invention, audio signals can be transmitted over a band two to three times wider than the transmission band defined as the standard on the Bluetooth radio link, i.e., from 0 to 4 kHz. In this way, it is possible to largely improve the clearness and nature of transmitted audio which has been damaged in the conventional transmission through the Bluetooth radio link.

This application is based on Japanese patent application No. 2000-380672 which is hereby incorporated by reference.

What is claimed is:

1. A transmitter for transmitting an analog signal having a predetermined frequency band by assigning said analog signal to at least one communication link for transmission, comprising:
    an initial setting circuit for exchanging initial setting information with a communication party to set proper communication format and protocol;
    a selector for selecting a communication link for use in transmission based on the initial setting information of the communication party acquired by said initial setting circuit;
    a transmitting circuit for transmitting the analog signal having the predetermined frequency band using the communication link selected by said selector; and
    a band divider for generating frequency components belonging to at least two divided frequency bands obtained by dividing said predetermined frequency band, as division signals, respectively,
    wherein when said selector selects at least two communication links, said band divider generates said division signals corresponding in number to said communication links.

2. A transmitter according to claim 1, wherein:
    said band divider divides the analog signal into three band division signals in a low frequency range, a middle frequency range and a high frequency range, each having a bandwidth of 4 kHz, when the analog signal has a frequency band from 0 to 12 kHz, and
    said band divider divides the analog signal into two band division signals respectively of a low frequency range and a high frequency range, each having a bandwidth 4 kHz, when the analog signal has a frequency band from 0 to 8 kHz.

3. A transmitter according to claim 2, wherein said communication format and protocol are based on a Bluetooth radio system, and a synchronous connection oriented (SCO) communication link in said system is employed as said communication link.

4. A transmitter according to claim 1, wherein said communication format and protocol are based on a Bluetooth radio system, and a synchronous connection oriented (SCO) communication link in said system is employed as said communication link.

5. A receiver for receiving a signal from a transmitter for transmitting an analog signal having a predetermined frequency band by assigning said analog signal to at least one communication link for transmission, said receiver comprising:
    an initial setting circuit for exchanging initial setting information with a communication party to set proper communication format and protocol;
    a selector for selecting a communication link for use in reception based on the initial setting information of the communication party acquired by said initial setting circuit; and
    a receiver/demodulator for receiving and demodulating the analog signal having the predetermined frequency band using the communication link selected by said selector,
    wherein:
    said receiver/demodulator includes a band synthesizer operative, when said selector selects at least two or mare communication links, to synthesize received band division signals received using the selected communication links.

6. A receiver according to claim 5, wherein:
    said band synthesizer synthesizes the analog signal from three band division signals in a low frequency range, a middle frequency range and a high frequency range, each having a bandwidth of 4 kHz, when the analog signal has a frequency band from 0 to 12 kHz, and synthesizes the analog signal from two band division signals in a low frequency range and a high frequency range, each having a bandwidth of 4 kHz, when the analog signal has a frequency band from 0 to 8 kHz.

7. A receiver according to claim 6, wherein said communication format and protocol are based on a Bluetooth radio system, and a synchronous connection oriented (SCO) communication link in said system is employed as said communication link.

8. A receiver according to claim 5, wherein said communication format and protocol are based on a Bluetooth radio system, and a synchronous connection oriented (SCO) communication link in said system is employed as said communication link.

9. A transmitting method for transmitting an analog signal having a predetermined frequency band by assigning said analog signal to at least one or more communication link for transmission, comprising:
  performing an initial setting operation of exchanging initial setting information with a communication party to set proper communication format and protocol;
  selecting a communication link for use in transmission based on the initial setting information of the communication party acquired by said initial setting operation; and transmitting the analog signal having the predetermined frequency band using the communication link selected by said selecting; and
  band dividing for generating frequency components belonging to at least two divided frequency bands obtained by dividing said predetermined frequency band, as division signals, respectively,
  wherein when at least two communication links are selected, said band dividing generates division signals corresponding in number to said communication links.

10. A transmitting method according to claim 9, wherein:
  in said band dividing the analog signal is divided into three band division signals in a low frequency range, a middle frequency range and a high frequency range, each having a bandwidth of 4 kHz, when the analog signal has a frequency band from 0 to 12 kHz, and
  in said band dividing the analog signal is divided into two band division signals respectively of a low frequency range and a high frequency range, each having a bandwidth 4 kHz, when the analog signal has a frequency band from 0 to 8 kHz.

11. A transmitting method according to claim 10, wherein said communication format and protocol are based on a Bluetooth radio system, and a synchronous connection oriented (SCO) communication link in said system is employed as said communication link.

12. A transmitting method according to claim 9, wherein said communication format and protocol are based on a Bluetooth radio system, and a synchronous connection oriented (SCO) communication link in said system is employed as said communication link.

13. A receiving method for receiving a signal from a transmitter for transmitting an analog signal having a predetermined frequency band by assigning said analog signal to at least one communication link for transmission, said receiving method comprising:
  an initial setting step for exchanging initial setting information with a communication party to set proper communication format and protocol;
  a selecting step for selecting a communication link for use in reception based on the initial setting information of the communication party acquired by said initial setting step; and
  a receiving/demodulating step for receiving and demodulating the analog signal having the predetermined frequency band using the communication link selected by said selecting step,
  wherein:
  said receiving/demodulating step includes a band synthesizing step for synthesizing, when said selector selects at least two or more communication links, received band division signals received using the selected communication links.

14. A receiving method according to claim 13, wherein:
  in said band synthesizing step the analog signal is synthesized from three band division signals in a low frequency range, a middle frequency range and a high frequency range, each having a bandwidth of 4 kHz, when the analog signal has a frequency band from 0 to 12 kHz, and the analog signal is synthesized from two band division signals in a low frequency range and a high frequency range, each having a bandwidth of 4 kHz, when the analog signal has a frequency band from 0 to 8 kHz.

15. A receiving method according to claim 14, wherein said communication format and protocol are based on a Bluetooth radio system, and a synchronous connection oriented (SCO) communication link in said system is employed as said communication link.

16. A receiving method according to claim 13, wherein said communication format and protocol are based on a Bluetooth radio system, and a synchronous connection oriented (SCO) communication link in said system is employed as said communication link.

* * * * *

UNITED STATES PATENT AND TRADEMARK OFFICE
CERTIFICATE OF CORRECTION

| | | |
|---|---|---|
| PATENT NO. | : 7,218,900 B2 | Page 1 of 1 |
| APPLICATION NO. | : 10/013848 | |
| DATED | : May 15, 2007 | |
| INVENTOR(S) | : Masami Suzuki | |

It is certified that error appears in the above-identified patent and that said Letters Patent is hereby corrected as shown below:

Claim 5, on column 10, line 53, delete "mare" and insert --more--.

Signed and Sealed this

Eleventh Day of September, 2007

JON W. DUDAS
*Director of the United States Patent and Trademark Office*